United States Patent [19]
Hofmann et al.

[11] 3,918,737
[45] Nov. 11, 1975

[54] WHEEL SUSPENSION FOR MOTOR VEHICLES

[75] Inventors: Rudolf Hofmann, Esslingen; Herbert Klemmer, Hardt, both of Germany

[73] Assignee: Dr. -Ing. H. c. F. Porsche Aktiengesellschaft, Germany

[22] Filed: Apr. 30, 1974

[21] Appl. No.: 465,545

[30] Foreign Application Priority Data
May 5, 1973 Germany............................ 2322785

[52] U.S. Cl............ 280/124 B; 280/96.2 R; 267/57
[51] Int. Cl.² .......................................... B62D 7/08
[58] Field of Search..... 280/96.2 R, 96.2 A, 96.2 B, 280/96.1, 124 B; 267/57

[56] References Cited
UNITED STATES PATENTS

| | | | |
|---|---|---|---|
| 2,660,449 | 11/1953 | MacPherson | 280/96.2 R |
| 3,237,962 | 3/1966 | Kraus et al. | 280/96.2 R |
| 3,257,123 | 6/1966 | Giouinazzo | 280/96.2 R |
| 3,278,196 | 10/1966 | Van Winsen | 280/96.2 R |
| 3,733,087 | 5/1973 | Allison | 280/96.2 R |

FOREIGN PATENTS OR APPLICATIONS

| | | | |
|---|---|---|---|
| 987,670 | 3/1965 | United Kingdom | 280/96.2 R |
| 129,626 | 10/1950 | Sweden | 280/96.2 R |
| 1,430,793 | 9/1969 | Germany | 280/96.2 R |

*Primary Examiner*—Kenneth H. Betts
*Assistant Examiner*—John P. Silverstrim
*Attorney, Agent, or Firm*—Craig & Antonelli

[57] ABSTRACT

A wheel suspension for motor vehicle in which each wheel of a pair of wheels is pivotally connected with the vehicle by means of a guide member and in which a stabilizer is provided for spring-supporting the wheels; the guide member thereby consists of a cast structural part while the free ends of the arms of the stabilizer extend through the guide member and are pivotally supported at the inlet side as well as at the outlet side of the guide member in such a manner that the pivot axis of a stabilizer arm is arranged in the plane containing also the pivot axis of the guide member.

18 Claims, 5 Drawing Figures

WHEEL SUSPENSION FOR MOTOR VEHICLES

The present invention relates to a wheel suspension for motor vehicles, in which each wheel of a pair of wheels is pivotally connected with the vehicle by means of a guide member and a stabilizer spring-supporting the wheels is provided.

Known guide members of this type, especially for the front wheels of motor vehicles, consists of sheet metal stampings or pressed-out parts, in which the stabilizer is secured on the guide member by means of mountings or the like. The axis of rotation of the stabilizer is located predominantly outside the plane of the pivot axis of the guide member, which becomes effective in a disadvantageous manner in that a bending of the angularly bent stabilizer arms is favored thereby.

Compared to the known guide member constructions with stabilizers, the present invention offers the advantage of a particularly simple and inexpensive construction. In particular, no additional fastening elements for the stabilizer at the guide member are necessary. On the other hand, the stabilizer can be connected safely and reliably with the guide member, under avoidance of bending forces engaging at the stabilizer. The latter takes place in a particularly advantageous manner in that the guide member consists of a cast structural part and the free arm ends of the stabilizer extend through the guide member and are pivotally supported at the inlet side and outlet side of the guide member in such a manner that the axes of rotation of the stabilizer arms are arranged in the plane of the pivot axis of the guide member.

According to a further feature of the present invention, the guide member is constructed hollow and has an essentially rectangular, closed cross section and is provided with cast-on bearing support eyes for a ball joint as well as for a spring leg. A guide body is created thereby in an advantageous manner according to the present invention which, compared to the hitherto-known guide members at front wheels, has a small weight and can be installed spacesavingly in the motor vehicle.

The bearing support of the stabilizer arms takes place in bearing eyes of the guide member which are constructed reinforced compared to the walls of the guide member, whereby bushes of elastic material adapted to be clamped into the bearing eyes are provided.

In order that a maximum saving in space becomes possible, provision is made according to a further feature of the present invention that within the area of the stabilizer arms extending through the guide members, the guide member is provided in the walls at the top side as well as at the bottom side with a longitudinally extending arcuate portion.

These and further objects, features and advantages of the present invention will become more apparent from the following description when taken in connection with the accompanying drawing which shows, for purposes of illustration only, one embodiment in accordance with the present invention, and wherein.

Figure 1:
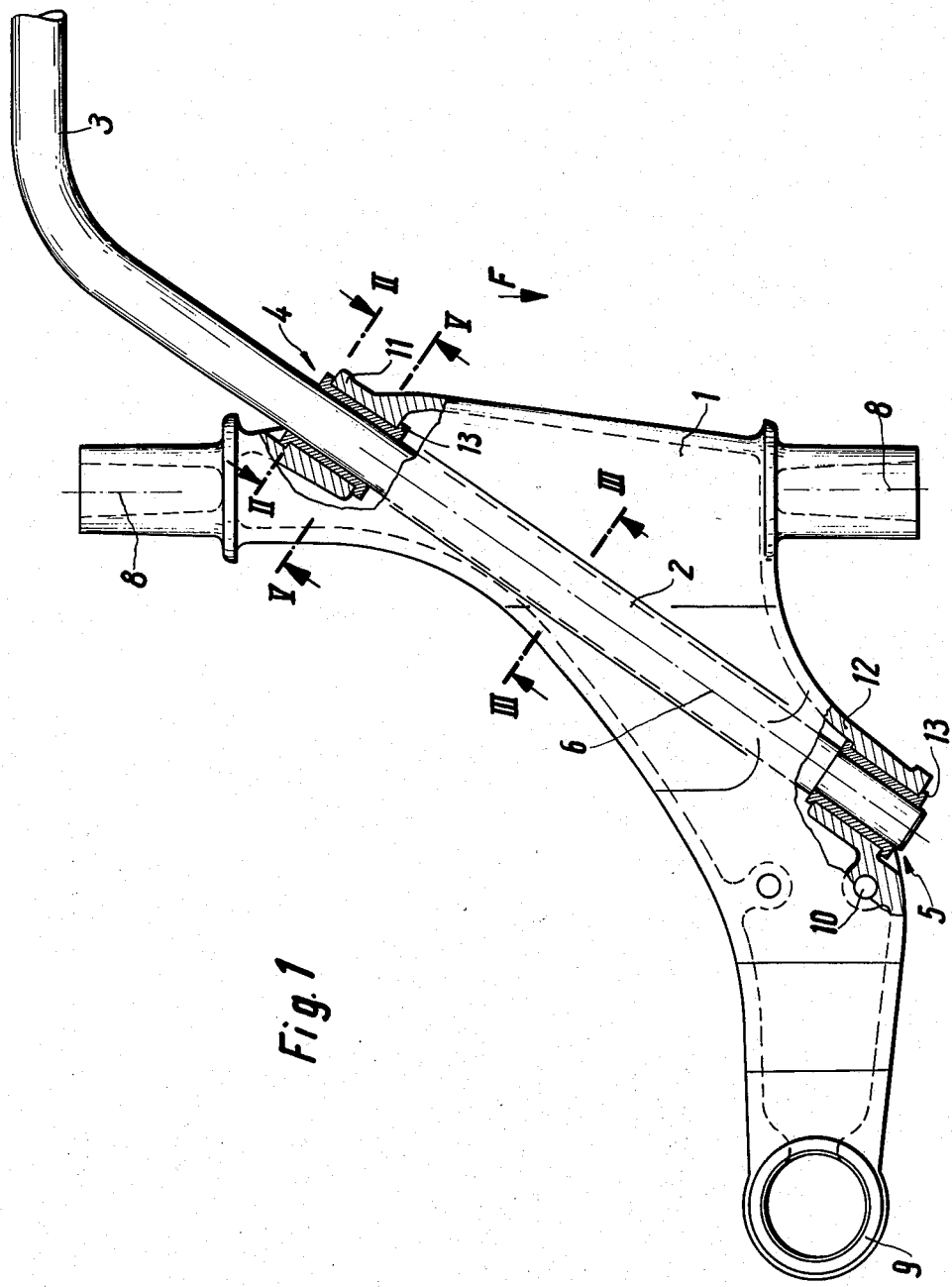
FIG. 1 is a plan view of the guide member in accordance with the present invention.

Referring now to the drawing wherein like reference numerals are used throughout the various views to designate like parts, the steerable front wheels (not shown) are suspended at the vehicle frame by means of guide members 1 of which a right guide member together with a stabilizer 3 is illustrated in the drawing.

A cross guide member is illustrated in FIG. 1 as guide element which consists of a one-piece, cast structural part. The guide member 1 is constructed hollow and essentially of closed, rectangular shape.

The stabilizer 3 is so arranged in the guide member that the free arm ends 2 of the stabilizer 3 extend through the guide member 1. The free arm ends 2 of the stabilizer 3 are supported in bearing eyes 11 and 12 of the guide member 1 both at the inlet side at 4 as well as at the outlet side at 5.

Figure 4:
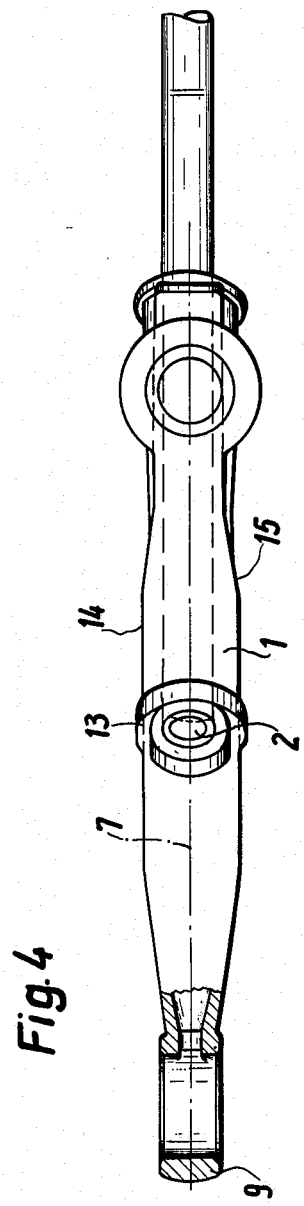
FIG. 4 is a front elevational view of the guide member.

The axis of rotation 6 of the stabilizer arm end 2 is disposed in the plane 7 (FIG. 4) together with the pivot axis 8 (FIG. 1) of the guide member 1 whereby the axis of rotation 6 is arranged inclined to the driving direction F (FIG. 1).

One elastic bush or sleeve 13 is clampingly held in each of the bearing eyes 11 and 12, in which are supported the arms 2 of the stabilizer 3. For purposes of fixing the position of the stabilizer arms 2 in the guide member 1, offsets, shoulders or lugs may be provided.

Figure 3:
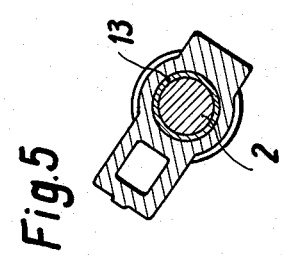
FIG. 3 is a cross-sectional view taken along line III—III of FIG. 1.
Figure 2:
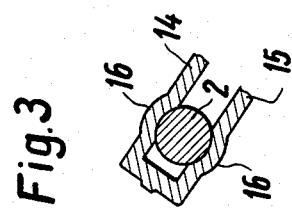
FIG. 2 is a cross-sectional view taken along line II—II of FIG. 1.
Figure 5:
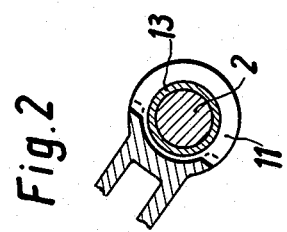
FIG. 5 is a cross-sectional view taken along line V—V of FIG. 1.

Within the area of the stabilizer arm 2 extending through the guide member 1, the hollow guide member body is provided at as well as 14 as wells as at the bottom side 15 with a convexly curved portion 16 (FIG. 3) which assures a free movement of the stabilizer arm.

The arrangement of the arm ends of the stabilizer 3 in the guide body in such a manner that the pivot axis 6 lies in a plane 7 together with the pivot axis 8 of the guide member 1, offers the advantage that only a slight axial displacement occurs, and bending forces are far-reachingly avoided.

As can be seen in particular from FIG. 1, the hollow cast guide member 1 which has a rectangular, closed cross section, is also provided with cast-on bearing eyes 9 and 10 for a ball joint and a spring leg, respectively, which may be conventional parts.

The arrangement according to the present invention of the stabilizer and the guide member is, however, not limited to a cross guide member but is applicable also to other known types of guide members.

Consequently, although we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed:

1. A suspension means for vehicle wheels comprising guide means for pivotally supporting a wheel to a vehicle frame about a first pivot axis of said guide means, said guide means including an elongated bore extending therethrough along a second pivot axis substantially coplanar and intersecting with said first pivot axis, first and second support means at opposite ends of said bore in said guide means, and stabilizer means for spring-supporting said wheel, said stabilizer means having a free arm end extending freely through said bore of said guide means, and being pivotally supported along said second pivot axis by said first and second support means.

2. A suspension means according to claim 1, wherein said guide means is a cast structural member.

3. A suspension means according to claim 2, wherein said guide means is a hollow member with a closed rectangular cross-section.

4. A suspension means according to claim 3, wherein said elongated bore is provided by longitudinally extending arcuate portions of the side walls of said rectangular cross-section.

5. A suspension means according to claim 4, wherein each of said first and second support means include a reinforced bearing eye of said guide means, and a bushing sleeve clampingly fixed in said bearing eye.

6. A suspension means according to claim 5, wherein said bushing sleeve is of elastic material.

7. A suspension means according to claim 6, wherein said free arm end is provided with means for fixing the position of said free arm ends in said guide means.

8. A suspension means according to claim 5, wherein two of said guide means are provided, each of said two guide means individually pivotally supporting a wheel of a wheel pair to the vehicle, and wherein said stabilizer means spring-supports said pair of wheels.

9. A suspension means according to claim 8, wherein said first pivot axis of each of said two guide means is in the direction of driving of the vehicle, and second pivot axis of each of said two guide means is inclined thereto.

10. A suspension means according to claim 1, wherein two of said guide means are provided, each of said two guide means individually pivotally supporting a wheel of a wheel pair to the vehicle, and wherein said stabilizer means spring-supports said pair of wheels.

11. A suspension means according to claim 1, wherein said guide means is a hollow member with a closed rectangular crosssection.

12. A suspension means according to claim 11, wherein said elongated bore is provided by longitudinally extending arcuate portions of the side walls of said rectangular cross-section.

13. A suspension means according to claim 1, wherein each of said first and second support means include a reinforced bearing eye of said guide means, and a bushing sleeve clampingly fixed in said bearing eye.

14. A suspension means according to claim 13, wherein said bushing sleeve is of elastic material.

15. A suspension means according to claim 1, wherein said guide means includes cast-on bearing support eyes for a ball-joint and a spring leg.

16. A suspension means according to claim 1, wherein said first pivot axis is in the direction of driving of the vehicle, and second pivot axis is inclined thereto.

17. A suspension means according to claim 1, wherein said free arm end is provided with means for fixing the position of said free arm ends in said guide means.

18. A suspension means according to claim 17, wherein said means for fixing include one of shoulders, offsets, and lugs.

* * * * *